(12) United States Patent
Balakrishnan et al.

(10) Patent No.: US 7,869,354 B2
(45) Date of Patent: Jan. 11, 2011

(54) ANALYZING AND GENERATING NETWORK TRAFFIC USING AN IMPROVED MARKOV MODULATED POISSON PROCESS MODEL WITH ONE BURSTY STATE AND A PLURALITY OF IDLE STATES

(75) Inventors: Ganesh Balakrishnan, Morrisville, NC (US); Jorge R. Rodriguez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 11/468,842

(22) Filed: Aug. 31, 2006

(65) Prior Publication Data
US 2008/0056131 A1    Mar. 6, 2008

(51) Int. Cl.
*H04J 1/16* (2006.01)
(52) U.S. Cl. .................. 370/230; 370/229; 370/232; 370/233
(58) Field of Classification Search .......... 370/229–252
See application file for complete search history.

(56) References Cited

U.S. PATENT DOCUMENTS

| | | | |
|---|---|---|---|
| 5,343,465 A | 8/1994 | Khalil | |
| 5,583,792 A | 12/1996 | Li et al. | |
| 6,597,660 B1 | 7/2003 | Rueda et al. | |
| 6,715,005 B1 | 3/2004 | Rodriguez et al. | |
| 7,412,241 B2* | 8/2008 | Strutt | 455/445 |
| 2004/0208127 A1* | 10/2004 | Rodriguez et al. | 370/235.1 |
| 2004/0208131 A1* | 10/2004 | Rodriguez et al. | 370/252 |
| 2005/0025054 A1* | 2/2005 | D. et al. | 370/235 |
| 2005/0071445 A1 | 3/2005 | Siorek et al. | |

OTHER PUBLICATIONS

Shah-Heydari et al. MMPP models for multimedia traffic. Nov. 29, 2004. Springer Netherlands. vol. 15, Nos. 3-4, pp. 273-293.*

F. Yegenoglu and B. Jabbari. Characterization and modeling of aggregate traffic for finite buffer statistical multiplexers. May 1994. Elsevier Science Publishers, Computer Networks and ISDN Systems, vol. 26, Issue 9, pp. 1169-1185.*

Pettersson; Notification Of Transmittal Of The International Search Report and The Written Opinion of the International Searching Authority, Or The Declaration; International Search Report; Nov. 20, 2007; Patent Cooperation Treaty; United Kingdom.

(Continued)

*Primary Examiner*—William Trost, IV
*Assistant Examiner*—Ashil Farahmand
(74) *Attorney, Agent, or Firm*—Brandon C. Kennedy; Cynthia G. Seal; Biggers & Ohanian, LLP (57) ABSTRACT

Methods and products are disclosed for analyzing network traffic using an improved Markov Modulated Poisson Process Model with one bursty state and a plurality of idle states that include: establishing a time scale of operation for each state in the improved MMPP model; establishing a transition value for each state in dependence upon the time scale of operation for the state; measuring inter-arrival times between individual packets received in one or more network adapters; and determining a current state for the network traffic independence upon the measured inter-arrival time of a most recently received packet and the transition values.

16 Claims, 8 Drawing Sheets

OTHER PUBLICATIONS

Friesen, et al.; The Effect of Multiplexing, Switching And Other Factors On The Performance Of Broadband Networks; Department of Computer Science; pp. 1194-1203; 10a.4.1; University of Waterloo; Waterloo; Ontario; Canada.

Frost, et al.; Traffic Modeling for Telecommunications Networks; IEEE Communications Magazine; Mar. 1994; pp. 70-81; 1994 IEEE.

Reddy, "Internet Traffic Variability (Long Range Dependency Effects)," CS8803, Fall 2003.

DaSilva et al., "Traffic Models," ECE 5984, Network Performance, Design, and Management, Bradley Dept. of Electrical and Computer Engineering, Virginia Polytechnic Institute and State Univ., Mar. 9, 2002.

Hyytia, "Characterization of Internet Traffic," S-38.149 Postgraduate Course in Teletraffic Theory, pp. 1-15, Oct. 11, 1999.

Samuel, "The Application of Non-Linear Dynamics to Teletraffic Modelling," Submitted for the Degree of Doctor of Philosophy, Dept. of Electronic Engineering, Queen Mary and Westfield College, Univ. of London, pp. 1-165, Jul. 1999.

Office Action Dated Jun. 23, 2009 in U.S. Appl. No. 11/514,493.

Office Action Dated Feb. 2, 2009 in U.S. Appl. No. 11/514,493.

Notice of Allowance Dated Nov. 24, 2009 in U.S. Appl. No. 11/514,493.

Examination Report Dated Nov. 25, 2009 in Application Serial No. 07-788-419.5-1525.

U.S. Appl. No. 11/512,493, filed May 29, 2008, Balakrishnan, et al.

Yegenoglu et al; "Characterization And Modeling Of Aggregate Traffic For Finite Buffer Statistical Multiplexers", Computer Networks and ISDN Systems 26 (1994), pp. 1169-1185.

Examination Report, Aug. 31, 2010; Application No. 07 788 419.5.

\* cited by examiner

ANALYZING AND GENERATING NETWORK TRAFFIC USING AN IMPROVED MARKOV MODULATED POISSON PROCESS MODEL WITH ONE BURSTY STATE AND A PLURALITY OF IDLE STATES

BACKGROUND OF THE INVENTION

1. Field of the Invention

The field of the invention is data processing, or, more specifically, methods and products for analyzing and generating network traffic using an improved Markov Modulated Poisson Process Model with one bursty state and a plurality of idle states.

2. Description of Related Art

The flow of information in a network is often called 'traffic.' Units of information used in network communication are referred to as 'packets.' Packets generally arrive at a point in the network at random intervals resulting in 'bursts' of traffic, causing congestion, and resulting in 'idle' periods in which traffic is somewhat more sparse.

Systems that use a network for communication can benefit from the analysis and characterization of the network traffic to optimize the critical performance parameters for optimal utilization of the various network resources. Examples of applications for this type of analysis may include the synchronization of a user process with the completion of the receive operation at the system to network interface, load balancing, routing, quality of service management, and adaptive tuning of the system/network performance parameters. One way to perform the analysis of network traffic is to provide a model that recognizes the characteristics of the network traffic. Over the past decade, network traffic as been characterized as both bursty and self-similar in nature. Bursty behavior describes network traffic that arrives in bursts at a point in the network. Self-similarity is the phenomenon in which network traffic behaves the same when viewed at different degrees of magnification, or different scales on a time dimension. Because network traffic has been shown to be bursty and self-similar, a method used to analyze network traffic should be able to represent behavior that is bursty in self-similar traffic.

Different methods are known for analyzing and characterizing network traffic. The Poisson Process is a widely used model to analyze traffic from voice sources. Bursty behavior in self-similar traffic, however, has been shown to be approximated by a Markov Modulated Poisson Process ('MMPP'). An MMPP model consists of two states that describe network traffic—a bursty state and an idle state. The bursty state represents the state of network traffic during a period when packet inter-arrival times are relatively small because the packets are arriving in bursts compared to other periods represented by the idle state in which packet inter-arrival times are relatively large because traffic is somewhat more sparse. The packet inter-arrival time is the time period between the arrival of one packet and the arrival of the next packet and may be measured from the perspective of one or more points on the network.

Current MMPP models work by transitioning between the bursty state and the idle state based on the mean inter-arrival times in each state and the inter-arrival time for the most recently received packet. The mean inter-arrival time for packets received in the bursty state is $\lambda^B_{mean}$. The mean inter-arrival time for packets received in the idle state is $\lambda^I_{mean}$. The transition from the idle state to the bursty state occurs when the inter-arrival time of the most recently received packet drops below $\lambda^B_{mean}$. Similarly, the transition from the bursty state to the idle state occurs when the inter-arrival time of the most recently received packet rises above $\lambda^I_{mean}$.

Although current MMPP models aid in the analysis of network traffic, a MMPP model in the current art does not provide the ability to characterize network traffic over multiple time scales. As a result, applications of network traffic analysis using current MMPP models suffer from inaccurate characterizations of network traffic. Furthermore, network modeling applications that use current MMPP models do not accurately generate self-similar network traffic with bursty behavior for use in designing, testing, and evaluation of network products such as routers, network adapters, bridges, and so on. Those skilled in the art, therefore, appreciate that a need exists for improved models for analyzing and generating network traffic.

SUMMARY OF THE INVENTION

Methods and products are disclosed for analyzing network traffic using an improved Markov Modulated Poisson Process Model with one bursty state and a plurality of idle states that include: establishing a time scale of operation for each state in the improved MMPP model; establishing a transition value for each state in dependence upon the time scale of operation for the state; measuring inter-arrival times between individual packets received in one or more network adapters; and determining a current state for the network traffic independence upon the measured inter-arrival time of a most recently received packet and the transition values.

Methods are also disclosed for generating network traffic using an improved Markov Modulated Poisson Process Model with one bursty state and a plurality of idle states that include: establishing a time scale of operation for each state in the model; generating an inter-arrival time for a next packet to be transmitted in dependence upon a current state for the improved MMPP model; and transmitting, from a network adapter, a packet in dependence upon the generated inter-arrival time.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
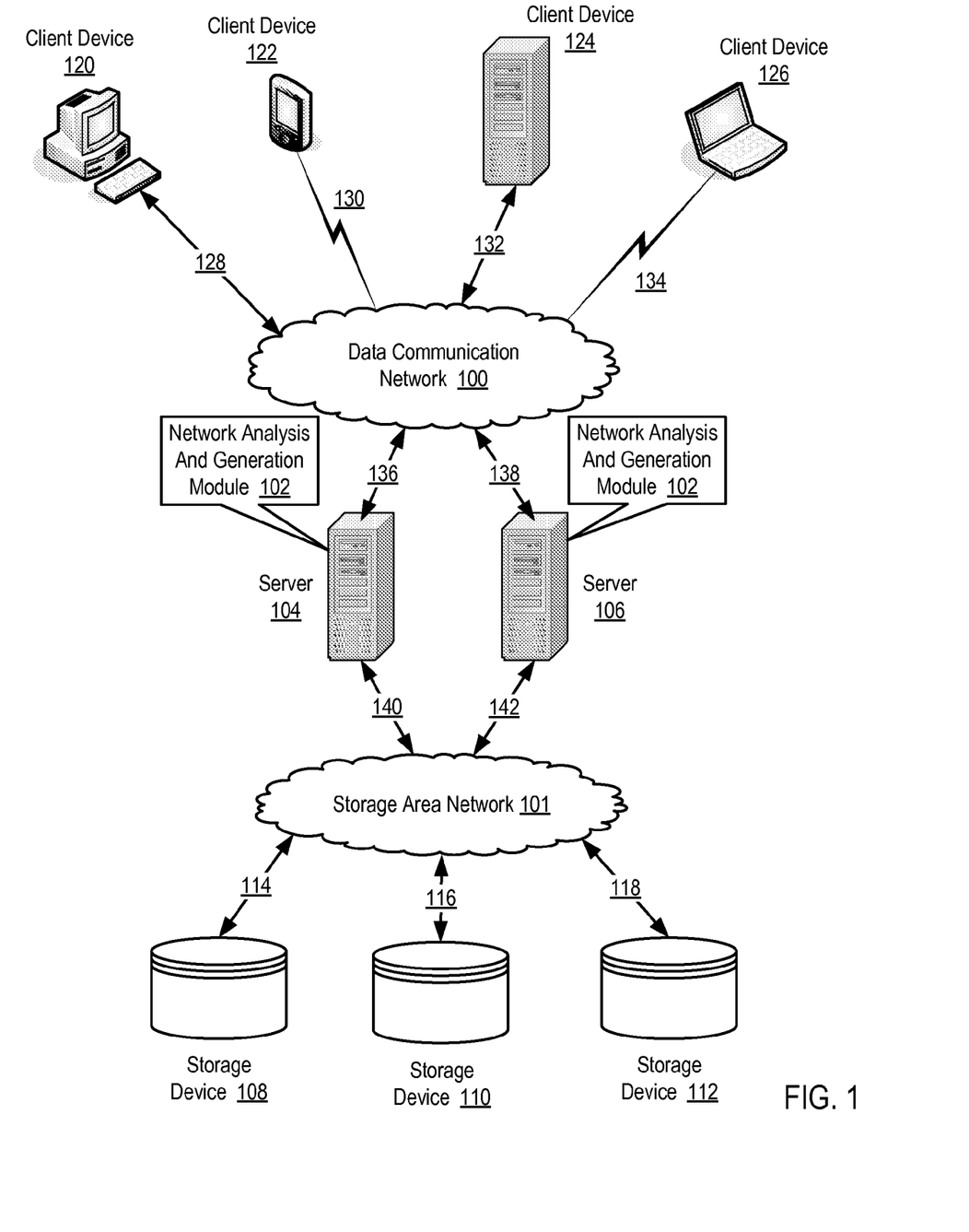
FIG. 1 sets forth a network diagram illustrating an exemplary system for analyzing and generating network traffic using an improved Markov Modulated Poisson Process Model with one bursty state and a plurality of idle states according to embodiments of the present invention.

Exemplary methods and products for analyzing and generating network traffic using an improved Markov Modulated Poisson Process Model with one bursty state and a plurality of idle states according to embodiments of the present invention are described with reference to the accompanying drawings, beginning with FIG. 1. FIG. 1 sets forth a network diagram illustrating an exemplary system for analyzing and generating network traffic using an improved Markov Modulated Poisson Process Model ('MMPP') with one bursty state and a plurality of idle states according to embodiments of the present invention.

The exemplary system of FIG. 1 includes two servers (104, 106) connected to data communications network (100) and storage area network ('SAN') (101). The server (104) connects to the data communications network (100) through wireline connection (136) and connects to the SAN (101) through wireline connection (140). The server (106) connects to the data communications network (100) through wireline connection (138) and connects to the SAN (101) through wireline connection (142).

Each server (104, 106) is a computer device having installed upon it a network analysis and generation module (102). The network analysis and generation module (102) of FIG. 1 includes computer program instructions configured for: establishing a time scale of operation for each state in the model; establishing a transition value for each state in dependence upon the time scale of operation for the state; measuring inter-arrival times between individual packets received in one or more network adapters; and determining a current state for the network traffic independence upon the measured inter-arrival time of a most recently received packet and the transition values. The network analysis and generation module (102) of FIG. 1 also includes computer program instructions configured for: establishing a time scale of operation for each state in the model; generating an inter-arrival time for a next packet to be transmitted in dependence upon a current state for the improved MMPP model; and transmitting, from a network adapter, a packet in dependence upon the generated inter-arrival time.

Each state in the model represents the particular characterization of network traffic based on the packet arrivals in a network adapter for a particular period of time. For example, the bursty state represents that the packets arriving in a network adapter for one time period arrive with small inter-arrival times relative to other time periods characterized by an idle state. That is, the packets arriving during one time period arrive relatively close together in 'bursts' compared to other time periods characterized by more sparse network traffic. An idle state represents that the packets arriving in a network adapter for one time period arrive with large inter-arrival times relative to other time periods characterized by the bursty state. Each state in the improved model has a transition value that is used by the model to specify when to transition from the bursty state to one of the idle states and vice versa.

In the example of FIG. 1, the network analysis and generation module (102) that is installed on each server (104, 106) analyzes and generates network traffic for network (100) and SAN (101) using an improved MMPP Model with one bursty state and a plurality of idle states in real-time. The network analysis and generation module (102) typically analyzes and generates network traffic for the network (100) and the SAN (101) separately. That is for each network (100, 101), the network analysis and generation module (102) typically determines a current state for the network traffic or transmits a packet according to the improved model. Although the network traffic of each separate network is typically analyzed or generated by the network analysis and generation module (102) of FIG. 1 separately, readers will note that such separate analysis or generation is not a limitation of the present invention.

The network analysis and generation module (102) of FIG. 1 may also analyze the network traffic for a network based on the packets received in one or more network adapters providing an interface to the network. For example, the network analysis and generation module (102) may analyze network traffic by restricting the analysis to packets received in a single network adapter installed in a single server. The network analysis and generation module (102) of FIG. 1 may also analyze network traffic by analyzing packets received in multiple network adapters installed in a single server. Still further, the network analysis and generation module (102) of FIG. 1 may analyze network traffic by analyzing packets received in a multiple network adapters installed across more than one server. In fact, there is no limitation to the number of network adapters or the number of devices into which the adapters are installed for analyzing and generating network traffic using an improved Markov Modulated Poisson Process Model with one bursty state and a plurality of idle states according to embodiments of the present invention.

In the exemplary system of FIG. 1, the data communications network (100) is the hardware and software infrastructure for connecting various devices together for data communications. In the example of FIG. 1, client device (120) connects to network (100) through a wireline connection (128). The client device (122) connects to network (100) through a wireless connection (130). The client device (124) connects to network (100) through a wireline connection (132). The client device (126) connects to network (100) through a wireless connection (134).

The SAN (101) of FIG. 1 is the hardware and software infrastructure for connecting various computer devices and storage device together for data communication. The primary purpose of the SAN (101) is to transfer data between computer devices and storage devices. SANs are typically implemented using the Ethernet (IEEE 802.3) standard or Fibre Channel standard, but any standard or protocol as will occur to those of skill in the art may be used to implement a SAN. In the example of FIG. 1, storage device (108) connects to SAN (101) through wireline connection (114). The storage device (110) connects to SAN (101) through wireline connection (116). The storage device (112) connects to SAN (101) through wireline connection (118). Storage device may be implemented as shared storage arrays, tape libraries, or any other devices as will occur to those of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Analyzing and generating network traffic using an improved Markov Modulated Poisson Process Model with one bursty state and a plurality of idle states in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary server (104) useful in analyzing and generating network traffic using an improved Markov Modulated Poisson Process Model with one bursty state and a plurality of idle states according to embodiments of the present invention. The server (104) of FIG. 2 includes at least one computer processor (156) or 'CPU' as well as random access memory (168) ('RAM') which is connected through a high speed memory bus (166) and bus adapter (158) to processor (156) and to other components of the server.

Figure 2:
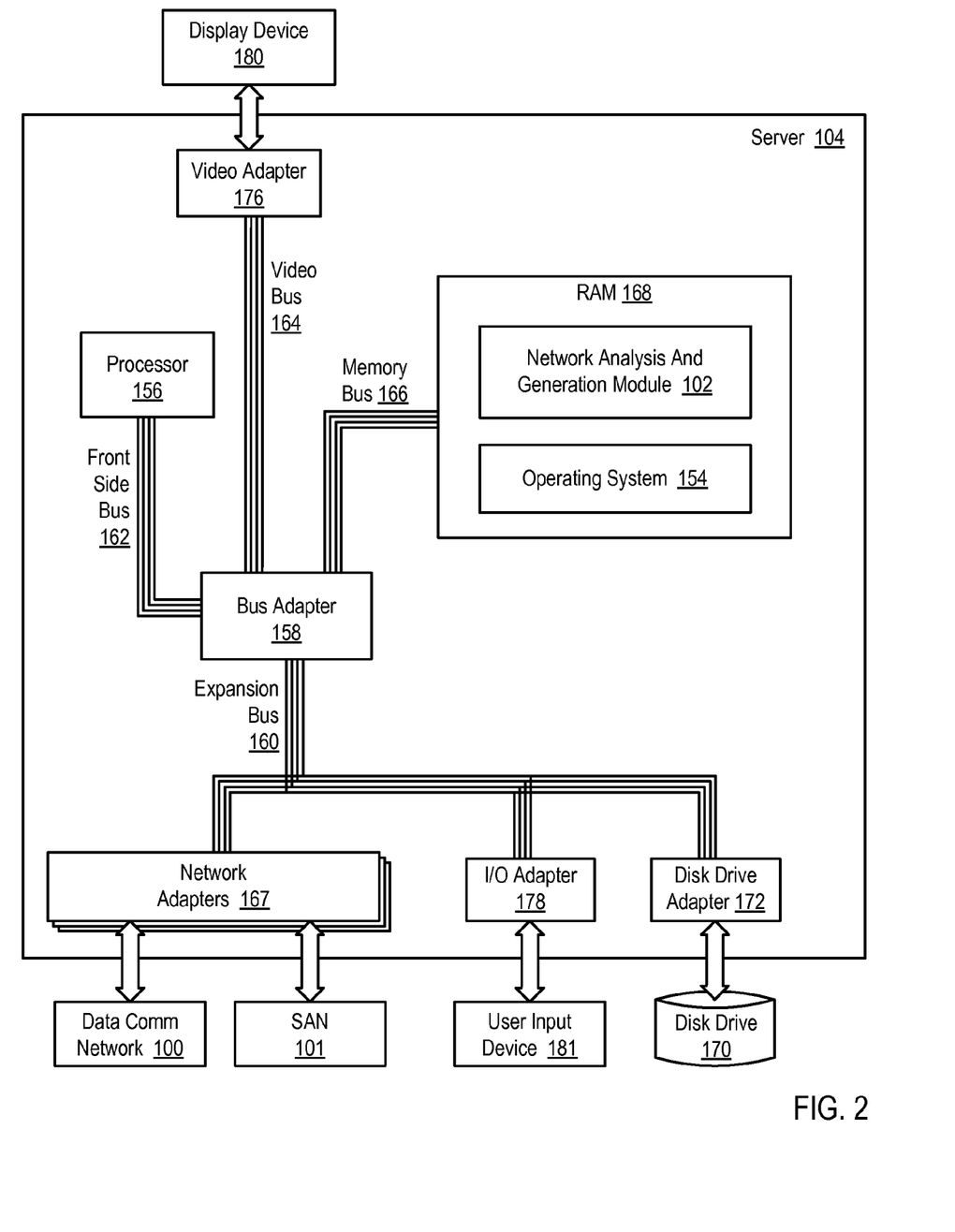
FIG. 2 sets forth a block diagram of automated computing machinery comprising an exemplary server useful in analyzing and generating network traffic using an improved Markov Modulated Poisson Process Model with one bursty state and a plurality of idle states according to embodiments of the present invention.

Stored in RAM (168) are a network analysis and generation module (102) and an operating system (154). The network analysis and generation module (102) illustrated in FIG. 2 is a software component, that is computer program instructions, that operate as described above with reference to FIG. 1 regarding the servers. The network analysis and generation module (102) of FIG. 2 may communicate with the components installed in the server (104), such as the network adapters (167), through function calls to the operating system (154), to installed device drivers (not shown), to computer BIOS, or in other manner as will occur to those of skill in the art. Operating systems useful in servers according to embodiments of the present invention include UNIX™, Linux™, Microsoft NT™, IBM's AIX™, IBM's i5/OS™, and others as will occur to those of skill in the art. The operating system (154) and the network analysis and generation module (102) in the example of FIG. 2 are shown in RAM (168), but many components of such software typically are stored in non-volatile memory also, for example, on a disk drive (170).

The exemplary server (104) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in servers useful according to embodiments of the present invention include the Intel Northbridge, the Intel Memory Controller Hub, the Intel Southbridge, and the Intel I/O Controller Hub. Examples of expansion buses useful in servers useful according to embodiments of the present invention may include Peripheral Component Interconnect ('PCI') buses and PCI Express ('PCIe') buses.

The exemplary server (104) of FIG. 2 also includes disk drive adapter (172) coupled through expansion bus (160) and bus adapter (158) to processor (156) and other components of the exemplary server (104). Disk drive adapter (172) connects non-volatile data storage to the exemplary server (104) in the form of disk drive (170). Disk drive adapters useful in servers include Integrated Drive Electronics ('IDE') adapters, Small Computer System Interface ('SCSI') adapters, and others as will occur to those of skill in the art. In addition, non-volatile computer memory may be implemented for a server as an optical disk drive, electrically erasable programmable read-only memory (so-called 'EEPROM' or 'Flash' memory), RAM drives, and so on, as will occur to those of skill in the art.

The exemplary server (104) of FIG. 2 includes one or more input/output ('I/O') adapters (178). I/O adapters in servers implement user-oriented input/output through, for example, software drivers and computer hardware for controlling output to display devices such as computer display screens, as well as user input from user input devices (181) such as keyboards and mice. The exemplary server (104) of FIG. 2 includes a video adapter (176), which is an example of an I/O adapter specially designed for graphic output to a display device (180) such as a display screen or computer monitor. Video adapter (176) is connected to processor (156) through a high speed video bus (164), bus adapter (158), and the front side bus (162), which is also a high speed bus.

The exemplary server (104) of FIG. 2 also includes network adapters (167) for data communications with a data communications network (200) and for data communications with a storage area network (101). Such data communications may be carried out through data communications networks such as IP data communications networks, through storage area networks such as Fibre Channel networks, and in other ways as will occur to those of skill in the art. Network adapters implement the hardware level of data communications through which one computer device sends data communications to another computer device through a data communications network. Examples of communications adapters useful for analyzing and generating network traffic using an improved Markov Modulated Poisson Process Model with one bursty state and a plurality of idle states according to embodiments of the present invention include IEEE 802.3 Ethernet adapters for wired data communications network communications, IEEE 802.11b adapters for wireless data communications network communications, Fibre Channel network adapters, and so on.

Figure 3A:
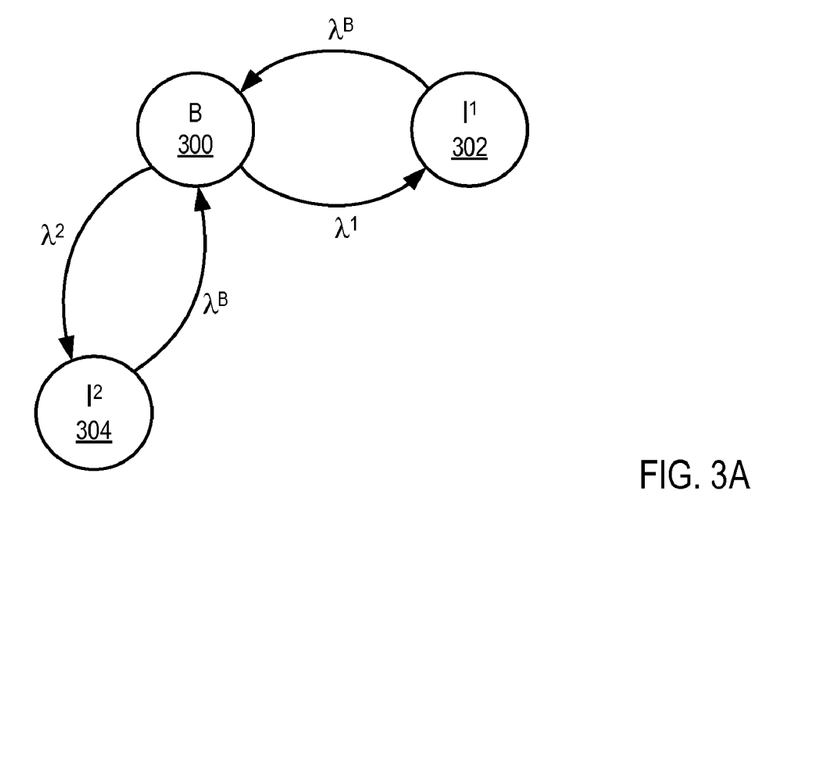
FIG. 3A sets forth an exemplary state diagram illustrating an example of an improved Markov Modulated Poisson Process Model with one bursty state and two idle states according to embodiments of the present invention.

For further explanation, FIG. 3A sets forth an exemplary state diagram illustrating an example of an improved Markov Modulated Poisson Process Model with one bursty state and two idle states according to embodiments of the present invention. The state diagram of FIG. 3A includes a bursty state 'B' (300), a first idle state 'I1' (302), and a second idle state 'I2' (304). Each state in the improved MMPP model describes the inter-arrival times of packets over different time scales of operation. Typically, the time scales of operation between the states differ by at least one order of magnitude. For example, the bursty state (300) may describe inter-arrival times of packet over a range of 10 milliseconds to 100 milliseconds, a first idle state (302) may describe inter-arrival times of packets over a range of 100 milliseconds to 1000 milliseconds, and a second idle state (304) may describe inter-arrival times of packets over a range of 1 second to 10 seconds. In such an example, when the inter-arrival times of packets are within the range of 10 milliseconds to 100 milliseconds, the state of the network traffic may be represented by the bursty state. When the inter-arrival times of packets are within the range of 100 milliseconds to 1000 milliseconds, the state of the network traffic may be represented by the first idle state. When the inter-arrival times of packets are within the range of 1 second to 10 seconds, the state of the network traffic may be represented by the second idle state. Because each state (300, 302, 304) of FIG. 3A describes inter-arrival times of packets over a different time scale of operation, an improved MMPP model with one bursty state and a plurality of idle states according to embodiments of the present invention provides the advantage of accurately characterizing network traffic that is both bursty and self-similar over multiple time scales.

To describe inter-arrival times of packets over a particular time scale, each state (300, 302, 304) in the example of FIG. 3A is described by an exponential distribution of packet inter-arrival times across the particular time scale for the state. The exponential distribution for each state (300, 302, 304) is defined using a distribution mean and a distribution standard deviation specified in terms of the time scale established for the state. Using the exemplary values for time scales mentioned above, for example, the exponential distribution for the bursty state may be defined using a mean inter-arrival time $\lambda^B_{mean}$ for the bursty state having a value of 50 milliseconds and a standard deviation of 15 milliseconds. Defining the exponential distribution using such exemplary values allows the bursty state (300) of FIG. 3A to represent the state of network traffic when the packet inter-arrival times vary over the exemplary range of 10 milliseconds to 100 milliseconds. To represent the state of network traffic when the packet inter-arrival times vary over the exemplary range of 100 milliseconds to 1000 milliseconds, the exponential distribution for the first idle state (302) may be defined using a mean inter-arrival time $\lambda^{I1}_{mean}$ having a value of 500 milliseconds and a standard deviation of 150 milliseconds. To represent the state of network traffic when the packet inter-arrival times vary over the exemplary range of 1 second to 10 seconds, the exponential distribution for the second idle state (304) may be defined using a mean inter-arrival time $\lambda^{I2}_{mean}$ having a value of 5 seconds and a standard deviation of 1.5 seconds.

In the example of FIG. 3A, each state (300, 302, 304) has a transition value that is established in dependence upon the time scale of operation for the state. A transition value is a value used by the model to specify when to transition from the bursty state to one of the idle states and vice versa. In the example of FIG. 3A, the transition value for the bursty state (300) is $\lambda^B$. The transition value for the first idle state (302) is $\lambda^1$. The transition value for the second idle state (304) is $\lambda^2$. In the example of FIG. 3A, $\lambda^B$ is substantially less than $\lambda^1$; $\lambda^1$ is substantially less than $\lambda^2$; and $\lambda^2$ substantially is less than $\lambda^3$. The term 'substantially' means that the values of the transition values vary by at least one order of magnitude.

The transition value for each state may be implemented as a transition value $\lambda_{mean}$ that is the mean inter-arrival time of the packets received during the state. Using the exemplary mean values for each state's exponential distribution mentioned above, the transition value $\lambda^B$ for the bursty state (300) may be 50 milliseconds, the transition value $\lambda^1$ for the first idle state (302) may be 500 milliseconds, and the transition value $\lambda^2$ for the second idle state (304) may be 5 seconds. Using these exemplary transition values, when the inter-arrival time of a packet is less than 50 milliseconds, then the current state of the network traffic may be represented by the bursty state (300). While in the bursty state (300), the current state of the network traffic may transition to the first idle state (302) if the inter-arrival time of a packet received in a network adapter is higher than 500 milliseconds but less than 5 seconds. The current state of the network traffic may transition to the second idle state (304) if the inter-arrival time of a packet received in a network adapter is higher than 5 seconds.

Instead of using the mean inter-arrival time for each state as the transition value, the transition value for the bursty state (300) may also be implemented as a transition value $\lambda^B_{max}$ that represents an upper boundary for the inter-arrival times in a bursty state and defines a probability $\rho^B$ that a packet with an inter-arrival time lower than $\lambda^B_{max}$ belongs to the bursty state (300). The transition value $\lambda^B_{max}$ may, for example, be calculated as five standard deviations greater than the mean inter-arrival time $\lambda^B_{mean}$ for the bursty state. While in the bursty state using such a value for $\lambda^B_{max}$, the relative probability that a packet arrival belongs to the bursty state when the inter-arrival time is smaller than $\lambda^B_{max}$ is greater than ninety-nine percent. The transition value for each idle state (302, 304) may be implemented as a transition value $\lambda^I_{min}$ that represents a lower boundary for the inter-arrival times in each idle state and defines a probability $\rho^I$ that a packet with an inter-arrival time higher than $\lambda^I_{min}$ belongs to the particular idle state for the transition value. The transition value $\lambda^I_{min}$ may, for example, be calculated as two standard deviations lower than the mean inter-arrival time $\lambda^I_{mean}$ for each idle state (302, 304). While in an idle state using such a value for $\lambda^I_{min}$, the relative probability that a packet arrival belongs to the idle state when the inter-arrival time is greater than $\lambda^I_{min}$ is greater than ninety-nine percent.

To prevent premature transitions between the bursty state and each of the idle states and vice versa, the improved MMPP model according to embodiments of the present invention may also include two barrier states (not shown) between the bursty state and each idle state in the improved MMPP model. In the example of FIG. 3A, for example, two barrier states may be included between the bursty state (300) and the first idle state (302) to prevent premature transitions between the bursty state (300) and the first idle state (302). Similarly, two barrier states may also be included between the bursty state (300) and the second idle state (304) to prevent premature transitions between the bursty state (300) and the second idle state (304). The barrier states may operate to prevent premature transitions by requiring more than one packet be received that satisfies transition requirements before completing the transition between the bursty state (300) and one of the idle states (302, 304) and vice versa. The requirement that more than one packet be received that satisfies transition requirements before completing the transition may be implemented by placing barrier states between the bursty state and each idle state and utilizing a counter value. Transitions from a barrier state to a state different than the previous state can be avoided unless the counter value reaches a certain predefined limit.

Because the improved MMPP model of FIG. 3A has two idle states implementing difference time scales of operation, the improved MMPP model provides the ability to identify or generate bursty network traffic among two idle periods that correspond to two different time scales. Using the exemplary time scale ranges from above, the improved MMPP model may be used to identify or generate bursty periods of network traffic among idle periods on a scale of 100 ms to 1000 ms and bursty periods of network traffic among idle periods on a scale of 1 s to 10 s. This ability allows for the model to distinguish between idle periods of different lengths. For further explanation, FIG. 3B sets forth an exemplary timing diagram of network traffic for analysis using the exemplary improved Markov Modulated Poisson Process Model with one bursty state and a plurality of idle states illustrated in FIG. 3A.

Figure 3B:
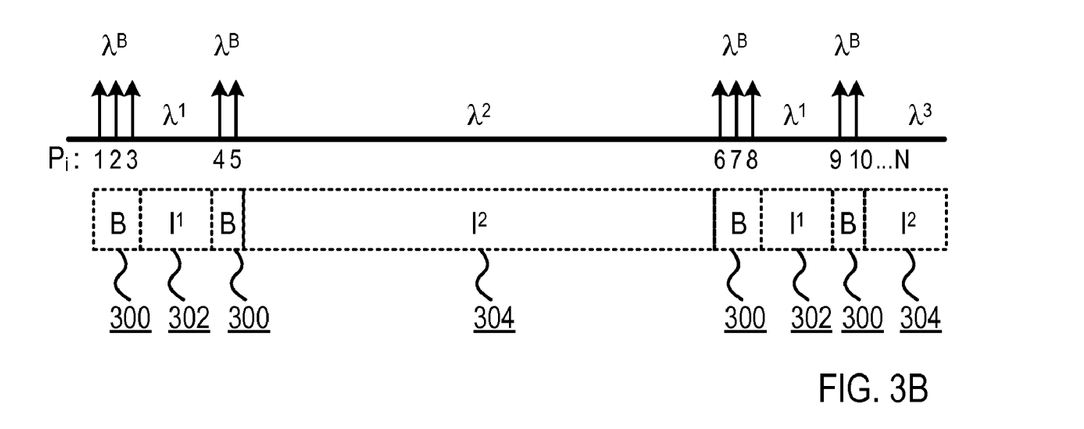
FIG. 3B sets forth an exemplary timing diagram of network traffic for analysis using the exemplary improved Markov Modulated Poisson Process Model with one bursty state and a plurality of idle states illustrated in FIG. 3A.

The timing diagram of FIG. 3B depicts the arrival of packets $P_1 \ldots P_{10} \ldots P_N$ using vertical arrows. The spaces between the vertical arrows represent the inter-arrival times between packets. In the timing diagram of FIG. 3B, the inter-arrival times between packets $P_1$, $P_2$, and $P_3$ are $\lambda^B$. The inter-arrival time between packets $P_3$ and $P_4$ is $\lambda^1$. The inter-arrival time between packets $P_4$ and $P_5$ is $\lambda^B$. The inter-arrival time between packets $P_5$ and $P_6$ is $\lambda^2$. The inter-arrival time between packets $P_6$, $P_7$, and $P_8$ are $\lambda^B$. The inter-arrival time between packets $P_8$ and $P_9$ is $\lambda^1$. The inter-arrival time between packets $P_9$ and $P_{10}$ is $\lambda^B$. The inter-arrival time between packets $P_{10}$ and $P_N$ is $\lambda^3$. In the example of FIG. 3B, $\lambda^B$ is substantially less than $\lambda^1$; $\lambda^1$ is substantially less than $\lambda^2$; and $\lambda^2$ substantially is less than $\lambda^3$.

Beneath each inter-arrival time represented in the timing diagram of FIG. 3B is the state in the improved MMPP model of FIG. 3A that corresponds to the particular inter-arrival time. Because $\lambda^B$ is the transition value for the bursty state (300) of FIG. 3A, the state of the improved MMPP model of FIG. 3A that corresponds to the inter-arrival times between packets $P_1$, $P_2$, and $P_3$ in FIG. 3B is the bursty state (300). Similarly, the state of the improved MMPP model of FIG. 3A that corresponds to the inter-arrival times between packets $P_4$ and $P_5$, the inter-arrival times between packets $P_6$, $P_7$, and $P_8$, and the inter-arrival times between packets $P_9$ and $P_{10}$ is the bursty state (300).

The bursty periods of network traffic in the timing diagram of FIG. 3B are scattered among several idle periods of network traffic that are represented by one of the idle state (302, 304) in the state diagram of FIG. 3A. The state of the improved MMPP model of FIG. 3A that corresponds to the inter-arrival times between packets $P_3$ and $P_4$ is the first idle state (302). The state of the improved MMPP model of FIG. 3A that corresponds to the inter-arrival times between packets $P_3$ and $P_4$ is the first idle state (302). Similarly, the state of the improved MMPP model of FIG. 3A that corresponds to the inter-arrival times between packets $P_8$ and $P_9$ is the first idle state (302). The state of the improved MMPP model of FIG. 3A that corresponds to the inter-arrival times between packets $P_5$ and $P_6$ is the second idle state (304). Also, because $\lambda^3$ is greater than $\lambda^2$, the state of the improved MMPP model of FIG. 3A that corresponds to the inter-arrival times between packets $P_{10}$ and $P_N$ is the second idle state (304).

As mentioned above, the first idle state (302) and the second idle state (304) characterize network traffic using different time scales of operation. The first idle state (302) may, for example, characterize network traffic with an exponential distribution across a time scale of 100 milliseconds to 1000 milliseconds, while the second idle state (304) may, for example, characterize network traffic with an exponential distribution across a time scale of 1 second to 10 seconds. Readers will note from the exemplary timing diagram of FIG. 3B, having idle states that characterize network traffic according to different time scales allows the improved MMPP model to distinguish between idle periods of network traffic having different lengths.

Figure 4A:
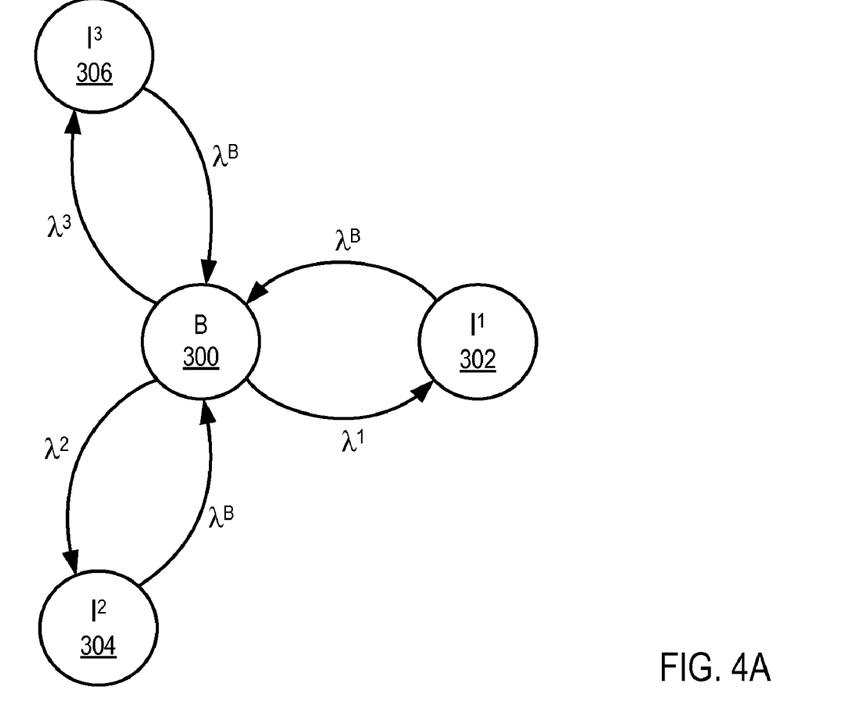
FIG. 4A sets forth a further exemplary state diagram illustrating an example of an improved Markov Modulated Poisson Process Model with one bursty state and three idle states according to embodiments of the present invention.

Increasing the number of idle states in the improved MMPP model according to embodiments of the present invention increases the ability of the improved MMPP model to distinguish between various idle periods of network traffic having different lengths. For further explanation, therefore, FIG. 4A sets forth a further exemplary state diagram illustrating an example of an improved Markov Modulated Poisson Process Model with one bursty state and three idle states according to embodiments of the present invention. The exemplary state diagram of FIG. 4A is similar to the exemplary state diagram of FIG. 3A. That is, the exemplary state diagram of FIG. 4A is similar to the exemplary state diagram of FIG. 3A in that the state diagram of FIG. 4A includes a bursty state 'B' (300), a first idle state 'I$^1$' (302), and a second idle state 'I$^2$' (304). The state diagram of FIG. 4A also includes a third idle state 'I$^3$' (306). Each state in the improved MMPP model of FIG. 4A describes the inter-arrival times of packets over different time scales of operation. For example, the bursty state (300) may describe inter-arrival times of packet over a range of 10 milliseconds to 100 milliseconds, a first idle state (302) may describe inter-arrival times of packets over a range of 100 milliseconds to 1000 milliseconds, a second idle state (304) may describe inter-arrival times of packets over a range of 1 second to 10 seconds, and the third idle state (306) may describe inter-arrival times of packets over a range of 10 seconds to 100 seconds.

In the exemplary state diagram of FIG. 4A, each state (300, 302, 304, 306) has a transition value that is established in dependence upon the time scale of operation for the state. In the example of FIG. 4A, the transition value for the bursty state (300) is $\lambda^B$; the transition value for the first idle state (302) is $\lambda^1$; the transition value for the second idle state (304) is $\lambda^2$; and the transition value for the third idle state (304) is $\lambda^3$. In the example of FIG. 4A, $\lambda^B$ is substantially less than $\lambda^1$; $\lambda^1$ is substantially less than $\lambda^2$; and $\lambda^2$ substantially is less than $\lambda^3$.

As mentioned above, the transition value for each state (300, 302, 304, 306) may be implemented as a transition value $\lambda_{mean}$ that is the mean inter-arrival time of the packets received during the state. Instead of using the mean inter-arrival time for each state as the transition value, the transition value for the bursty state (300) may also be implemented as a transition value $\lambda^B_{max}$ that represents an upper boundary for the inter-arrival times in a bursty state and defines a probability $\rho^B$ that a packet with an inter-arrival time lower than $\lambda^B_{max}$ belongs to the bursty state (300). The transition value for each idle state (302, 304, 306) may be implemented as a transition value $\lambda^I_{min}$ that represents a lower boundary for the inter-arrival times in each idle state and defines a probability $\rho^I$ that a packet with an inter-arrival time higher than $\lambda^I_{min}$ belongs to the particular idle state for the transition value.

Because the improved MMPP model of FIG. 4A has three idle states implementing difference time scales of operation, the improved MMPP model provides the ability to identify or generate bursty network traffic among three idle periods that correspond to three different time scales. This ability allows for the model to distinguish between idle periods of different lengths. For further explanation, FIG. 4B sets forth a further exemplary timing diagram of network traffic for analysis using the exemplary improved Markov Modulated Poisson Process Model with one bursty state and a plurality of idle states illustrated in FIG. 4A.

Figure 4B:
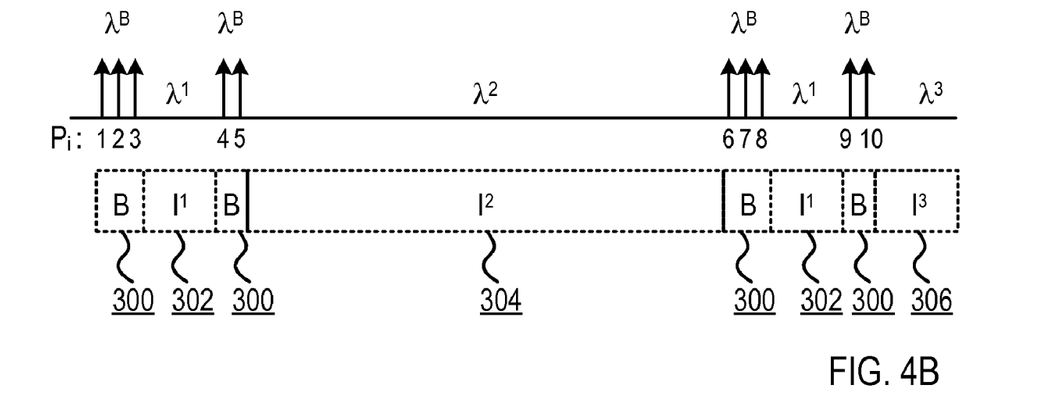
FIG. 4B sets forth a further exemplary timing diagram of network traffic for analysis using the exemplary improved Markov Modulated Poisson Process Model with one bursty state and a plurality of idle states illustrated in FIG. 4A.

The timing diagram of FIG. 4B is similar to the timing diagram of FIG. 3B. The timing diagram of FIG. 4B depicts the arrival of packets $P_1 \ldots P_{10} \ldots P_N$ using vertical arrows. The spaces between the vertical arrows represent the inter-arrival times between packets. The inter-arrival times $\lambda^B$, $\lambda^1$, $\lambda^2$, and $\lambda^3$ between packets $P_1 \ldots P_{10} \ldots P_N$ in the exemplary timing diagram of FIG. 4B are the same as the inter-arrival times between packets $P_1 \ldots P_{10} \ldots P_N$ in the exemplary timing diagram of FIG. 3B.

Beneath each inter-arrival time represented in the timing diagram of FIG. 4B is the state in the improved MMPP model of FIG. 4A that corresponds to the particular inter-arrival time. The states in FIG. 4B beneath each of the inter-arrival times $\lambda^B$, $\lambda^1$, and $\lambda^2$ are the same states beneath each of the inter-arrival times $\lambda^B$, $\lambda^1$, and $\lambda^2$ as depicted in FIG. 3B because the improved model of FIG. 4A includes all the states of the improved MMPP model of FIG. 3A. In FIG. 4B, however, the state depicted beneath the inter-arrival time $\lambda^3$ between packets $P_{10}$ and $P_N$ is the third idle state (306). Because $\lambda^3$ is the transition value for the third idle state (306), an inter-arrival time between packets $P_{10}$ and $P_N$ of $\lambda^3$ transitions the improved MMPP model of FIG. 4A into the third idle state (306). The three idle states (302, 304, 306), therefore, provide the ability to distinguish between idle periods of network traffic having three different lengths.

Although increasing the number of idle states in the improved MMPP model increases the ability of the improved MMPP model to distinguish between various idle periods of network traffic having different lengths, idle states may also be integrated into the bursty state to alter the granularity at which the improved MMPP model characterizes network traffic as either bursty or idle. For further explanation, therefore, FIG. 5A sets forth a further exemplary state diagram illustrating an example of an improved Markov Modulated Poisson Process Model with one bursty state and a plurality of idle states according to embodiments of the present invention in which an idle state has been integrated into the bursty state (300).

Figure 5A:
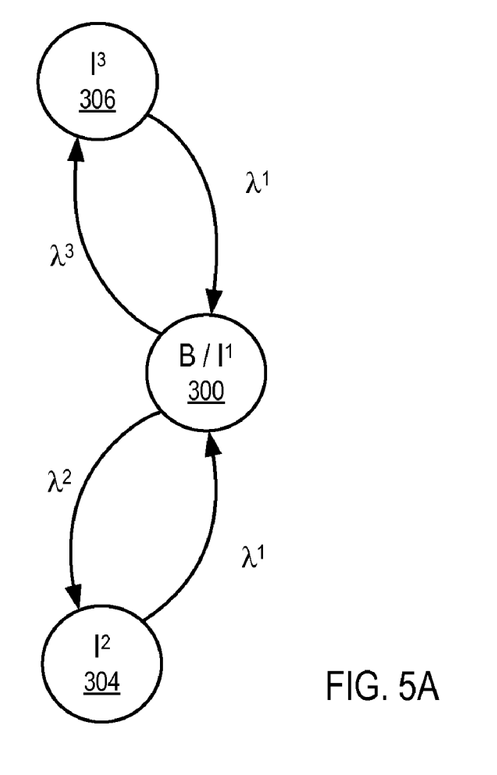
FIG. 5A sets forth a further exemplary state diagram illustrating an example of an improved Markov Modulated Poisson Process Model with one bursty state and a plurality of idle states according to embodiments of the present invention in which an idle state has been integrated into the bursty state.

The exemplary state diagram of FIG. 5A is similar to the exemplary state diagram of FIG. 4A. That is, the exemplary state diagram of FIG. 5A is similar to the exemplary state diagram of FIG. 4A in that the state diagram of FIG. 5A includes a bursty state 'B' (300), an idle state 'I²' (304), and an idle state 'I³' (306) having transition values $\lambda^B$, $\lambda^2$, and $\lambda^3$, respectively. In the example of FIG. 5A, however, the first idle state (302) of FIG. 4A has been integrated into the bursty state (300). Integrating an idle state into the bursty state (300) refers to calibrating the exponential distribution of the bursty state (300) to cover the time scale covered by the integrated idle state. A transition value for the bursty state (300) may then be established in dependence upon the new time scale of the bursty state (300). In the example of FIG. 5A, the transition value for the bursty state (300) is $\lambda^1$. Readers will recall from above that $\lambda^B$ is substantially less than $\lambda^1$; $\lambda^1$ is substantially less than $\lambda^2$; and that $\lambda^2$ substantially is less than $\lambda^3$. Values for packet inter-arrival times equal to $\lambda^B$, which are less than the transition value $\lambda^1$, along with values less than or equal to $\lambda^1$ may, therefore, result in a transition to the bursty state (300). As such, the granularity at which the improved MMPP model of FIG. 5A characterizes network traffic as either bursty or idle has been altered to no longer to detect idle periods at the time scale detected by the first idle state (304) of FIG. 4A and now integrated into the bursty state (300) of FIG. 5A.

Figure 5B:
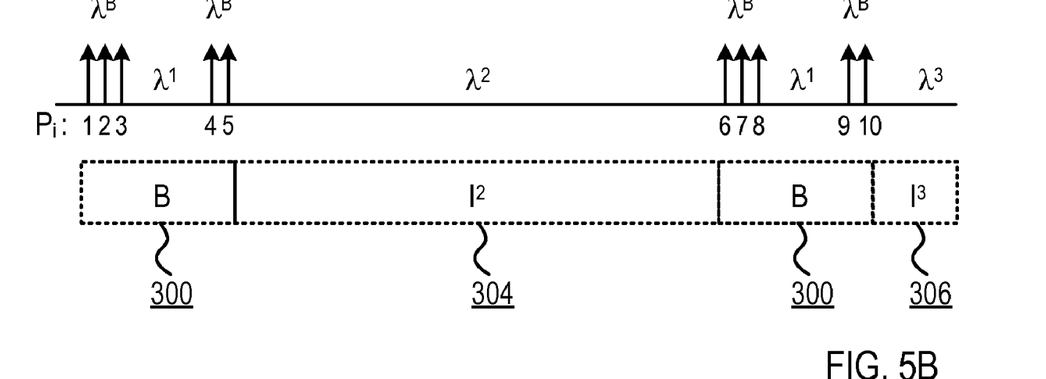
FIG. 5B sets forth a further exemplary timing diagram of network traffic for analysis using the exemplary improved Markov Modulated Poisson Process Model with one bursty state and a plurality of idle states illustrated in FIG. 5A.

For further explanation, FIG. 5B sets forth a further exemplary timing diagram of network traffic for analysis using the exemplary improved Markov Modulated Poisson Process Model with one bursty state and a plurality of idle states illustrated in FIG. 5A. The timing diagram of FIG. 5B is similar to the timing diagram of FIG. 4B. The timing diagram of FIG. 5B depicts the arrival of packets $P_1 \ldots P_{10} \ldots P_N$ using vertical arrows. The spaces between the vertical arrows represent the inter-arrival times between packets. The inter-arrival times $\lambda^B$, $\lambda^1$, $\lambda^2$, and $\lambda^3$ between packets $P_1 \ldots P_{10} \ldots P_N$ in the exemplary timing diagram of FIG. 5B are the same as the inter-arrival times between packets $P_1 \ldots P_{10} \ldots P_N$ in the exemplary timing diagram of FIG. 4B.

Beneath each inter-arrival time represented in the timing diagram of FIG. 5B is the state in the improved MMPP model of FIG. 5A that corresponds to the particular inter-arrival time. The correspondence between inter-arrival times $\lambda^B$, $\lambda^1$, $\lambda^2$, and $\lambda^3$ and states in FIG. 5B is similar to the correspondence in FIG. 4B. In the example of FIG. 5B, however, the inter-arrival time $\lambda^1$ between packets $P_3$ and $P_4$ and between packets $P_8$ and $P_9$ now corresponds with the bursty state (300) because the granularity of improved MMPP model of FIG. 5A is reduced as compared with the improved MMPP model of FIG. 4A. Inter-arrival times of $\lambda^1$ or less in the improved MMPP model of FIG. 5A represent bursty network traffic.

As mentioned above, the improved MMPP models according to embodiments of the present invention may be utilized to analyze or generate network traffic. For further explanation, therefore, FIG. 6 sets forth a flow chart illustrating an exemplary method for analyzing network traffic using an improved Markov Modulated Poisson Process ('MMPP') Model with one bursty state and a plurality of idle states according to embodiments of the present invention.

Figure 6:
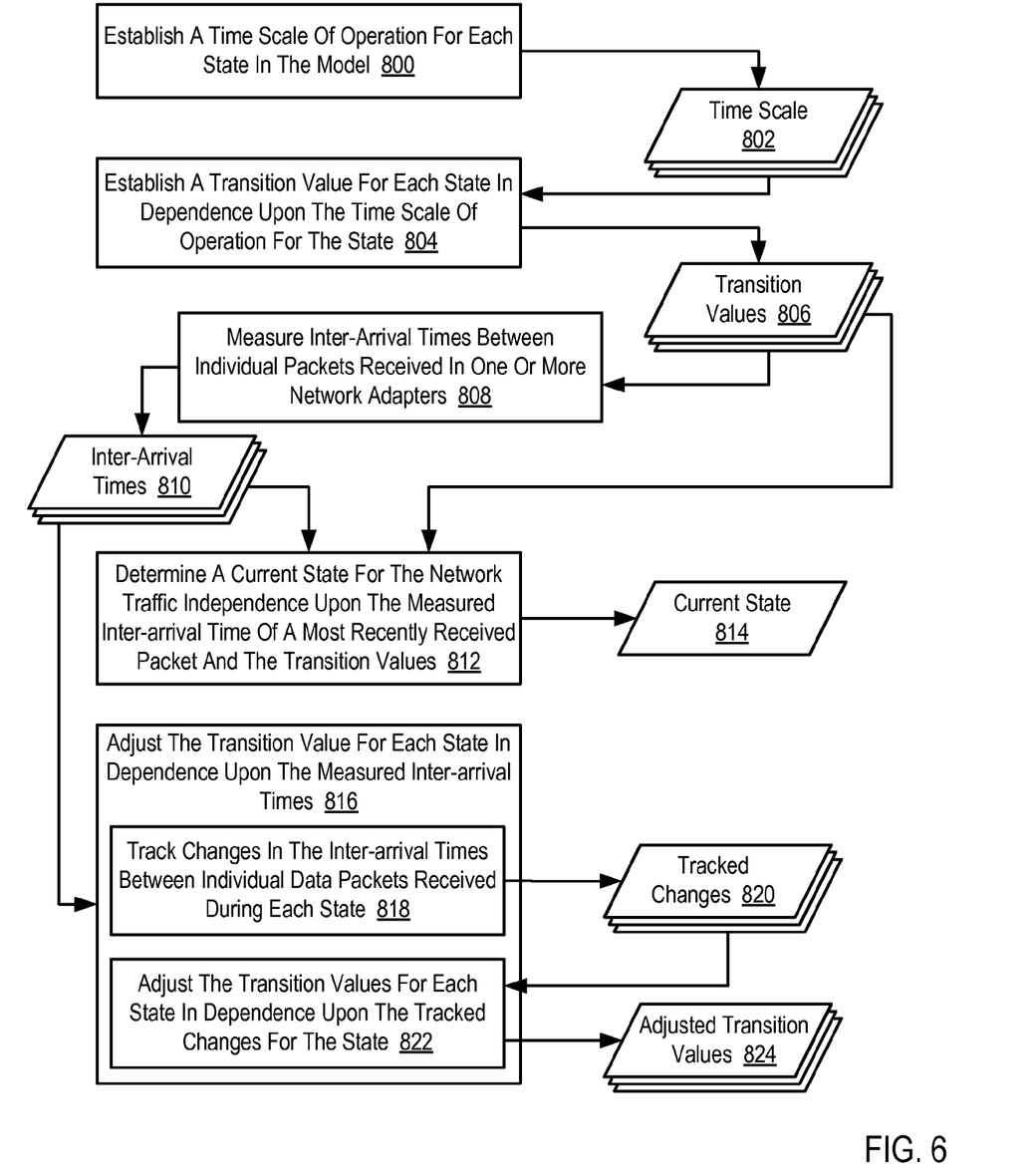
FIG. 6 sets forth a flow chart illustrating an exemplary method for analyzing network traffic using an improved Markov Modulated Poisson Process Model with one bursty state and a plurality of idle states according to embodiments of the present invention.

The method of FIG. 6 includes establishing (800) a time scale (802) of operation for each state in the improved MMPP model. Each time scale (802) represents the range of packet inter-arrival times. In the method of FIG. 6, establishing (800) a time scale (802) of operation for each state in the model may be carried out by setting values for each state's exponential distribution such that a substantial number of the inter-arrival times in each time scale (802) make up a substantial number of inter-arrival times covered by the exponential distribution describing a particular state. Consider, for example, an idle state for which a time scale of 1 second to 10 seconds is established. Such an exemplary time scale may be established for the idle state by setting the mean value and the standard deviation of the exponential distribution to values of 5 seconds and 2 seconds, respectively. That is, a substantial number of the inter-arrival times in time scale of 1 second to 10 seconds make up a substantial number of inter-arrival times covered by the exponential distribution defined by a distribution mean of 5 seconds and standard deviation of 2 seconds. The method of FIG. 6 also includes establishing (804) a transition value (806) for each state in dependence upon the time scale (802) of operation for the state. Each transition value (806) represents a value used by the model to specify when to transition from the bursty state to one of the idle states and vice versa. Establishing (804) a transition value (806) for each state in dependence upon the time scale (802) of operation for the state according to the method of FIG. 6 may be carried out by setting the transition value (806) for each state to a value in the same order of magnitude as a substantial number of the values of the time scale. Establishing (804) a transition value (806) for each state in dependence upon the time scale (802) of operation for the state according to the method of FIG. 6 may also be carried out by setting the transition value (806) for each state to a value in the same order of magnitude as the values used to describe the state for which the time scale (802) is established. Consider, for example, a time scale of 10 milliseconds to 100 milliseconds established for a bursty state. The values of used to define an exponential distribution over such an exemplary time scale that describes the bursty state may include a distribution mean value of 50 milliseconds and a distribution standard deviation of 15 milliseconds. The transition value along the same order of magnitude used describe the exponential distribution of the bursty state and a substantial number of values in the time scale may, for example, be a value of 50 milliseconds.

The example above illustrates that the transition value for each state may be implemented as a transition value $\lambda_{mean}$ that is the mean inter-arrival time of the packets received during the state—that is, the mean of the exponential distribution describing each state. However, instead of using the mean inter-arrival time for each state as the transition value, the transition value for the bursty state may also be implemented as a transition value $\lambda^B$ max that represents an upper boundary for the inter-arrival times in a bursty state and defines a probability $\rho^B$ that a packet with an inter-arrival time lower than $\lambda^B_{max}$ belongs to the bursty state. The transition value $\lambda^B_{max}$ may, for example, be calculated as five standard deviations greater than the mean inter-arrival time $\lambda^B_{mean}$ for the bursty state. The transition value for each idle state may be implemented as a transition value $\lambda^I_{min}$ that represents a lower boundary for the inter-arrival times in each idle state and defines a probability $\rho^I$ that a packet with an inter-arrival time higher than $\lambda^I_{min}$ belongs to the particular idle state for the transition value. The transition value $\lambda^I_{min}$ may, for example, be calculated as two standard deviations lower than the mean inter-arrival time $\lambda^I_{mean}$ for each idle state.

The method of FIG. 6 includes measuring (808) inter-arrival times (810) between individual packets received in one or more network adapters. Packet inter-arrival times (810) are the time periods between the arrival of consecutive packets in one or more network adapters. Measuring (808) inter-arrival times (810) between individual packets received in one or more network adapters according to the method of FIG. 6 may be carried out by retrieving arrival time stamps for the packets from one or more network adapters. Measuring (808) inter-arrival times (810) between individual packets received in one or more network adapters according to the method of FIG. 6 may further be carried out by repeatedly subtracting an arrival time-stamp for the most recently received packet in the network adapters from an arrival time-stamp for the second most recently received packet in the network adapters. When measuring (808) occurs across more than one network adapter, the clocks for each network adapter that provide the arrival time stamp may be synchronized periodically using a synchronization clock signal.

The method of FIG. 6 also includes determining (812) a current state (814) for the network traffic independence upon the measured inter-arrival time (810) of a most recently received packet and the transition values (806). The current state (814) of FIG. 6 represents one of the states defined by the improved model that characterizes the current network traffic. Determining (812) a current state (814) for the network traffic independence upon the measured inter-arrival time (810) of a most recently received packet and the transition values (806) according to the method of FIG. 6 may be carried out by setting the current state to the bursty state if the value of the measured inter-arrival time (810) of a most recently received packet is less than or equal to the transition value (806) for the bursty state when the previous state is an idle state. In such an embodiment, when the previous state is an idle state and the value of the measured inter-arrival time (810) is more than the transition value (806) for the bursty state, then the current state (814) remains the idle state. Determining (812) a current state (814) for the network traffic independence upon the measured inter-arrival time (810) of a most recently received packet and the transition values (806) according to the method of FIG. 6 may also be carried out by setting the current state to the idle state having the highest transition value (806) less than or equal to the measured inter-arrival time (810) of a most recently received packet when the previous state is the bursty state. In such an embodiment, when the previous state is the bursty state and no idle state has a transition value (806) less than or equal to the measured inter-arrival time (810), then the current state (814) remains the bursty state.

The method of FIG. 6 also includes adjusting (816) the transition values (806) for each state in dependence upon the measured inter-arrival times (810). Adjusting (816) the transition values (806) for each state in dependence upon the measured inter-arrival times (810) according to the method of FIG. 6 is carried out by tracking (818) changes (820) in the inter-arrival times (810) between individual data packets received during each state and adjusting (822) the transition values (824) for each state in dependence upon the tracked changes (820) for the state. The tracked changes (820) of FIG. 6 represent the changes in the packet inter-arrival times (810) over time for packets received in one or more network adapters during each of the state in the improved MMPP model. Readers will note that adjusting (816) the transition values (806) for each state in dependence upon the measured inter-arrival times (810) advantageously allows the analysis of network traffic using the improved MMPP Model according to embodiments of the present invention to become more accurate over time.

In the method of FIG. 6, tracking (818) changes (820) in the inter-arrival times (810) between individual data packets received during each state may be carried out by maintaining a moving average $\lambda_{mean}$ of the inter-arrival times between individual packets received during each state. Although tracking (818) changes (820) in the inter-arrival times (810) between individual data packets received during each state may be carried out using moving averages, tracking (818) changes (820) according to the method of FIG. 6 may also be carried out in other ways as will occur to those of skill in the art.

In the method of FIG. 6, adjusting (822) the transition values (824) for each state in dependence upon the tracked changes (820) for the state may be carried out by setting the transition value (824) for each state as the moving average $\lambda_{mean}$ of the inter-arrival times between individual packets received during each state. As mentioned above, instead of using the mean inter-arrival time for each state as the transition value, the transition value for the bursty state may be implemented as a transition value $\lambda^B_{max}$ that represents an upper boundary for the inter-arrival times in a bursty state and the transition value for each idle state may be implemented as a transition value $\lambda^I_{min}$ that represents a lower boundary for the inter-arrival times in each idle state. Adjusting (822) the transition values (824) for each state in dependence upon the tracked changes (820) for the state according to the method of FIG. 6 may also be carried out by adjusting the transition value $\lambda^B_{max}$ to five standard deviations greater than the moving average $\lambda^B_{mean}$ for the bursty state and adjusting the transition value $\lambda^I_{min}$ to two standard deviations lower than the moving average $\lambda^I_{mean}$ for each idle state. Although adjusting (822) the transition values (824) for each state in dependence upon the tracked changes (820) may be carried out using mean and standard deviation calculations, adjusting (822) the transition values (824) for each state in dependence upon the tracked changes (820) according to the method of FIG. 6 may also be carried out in other ways as will occur to those of skill in the art.

In addition to analyzing the current state of network traffic as described above, an improved Markov Modulated Poisson Process Model with one bursty state and a plurality of idle states may also be used to predict the inter-arrival times of future packets to be received in a network adapter. Such predications advantageously aid applications in the ability to synchronize user processes with the utilization of network resources. For further explanation, therefore, FIG. 7 sets forth a flow chart illustrating a further exemplary method for analyzing network traffic using an improved Markov Modulated Poisson Process ('MMPP') Model with one bursty state and a plurality of idle states according to embodiments of the present invention that includes predicting (900) an inter-arrival time (902) for a next packet to be received in dependence upon the current state (814).

Figure 7:
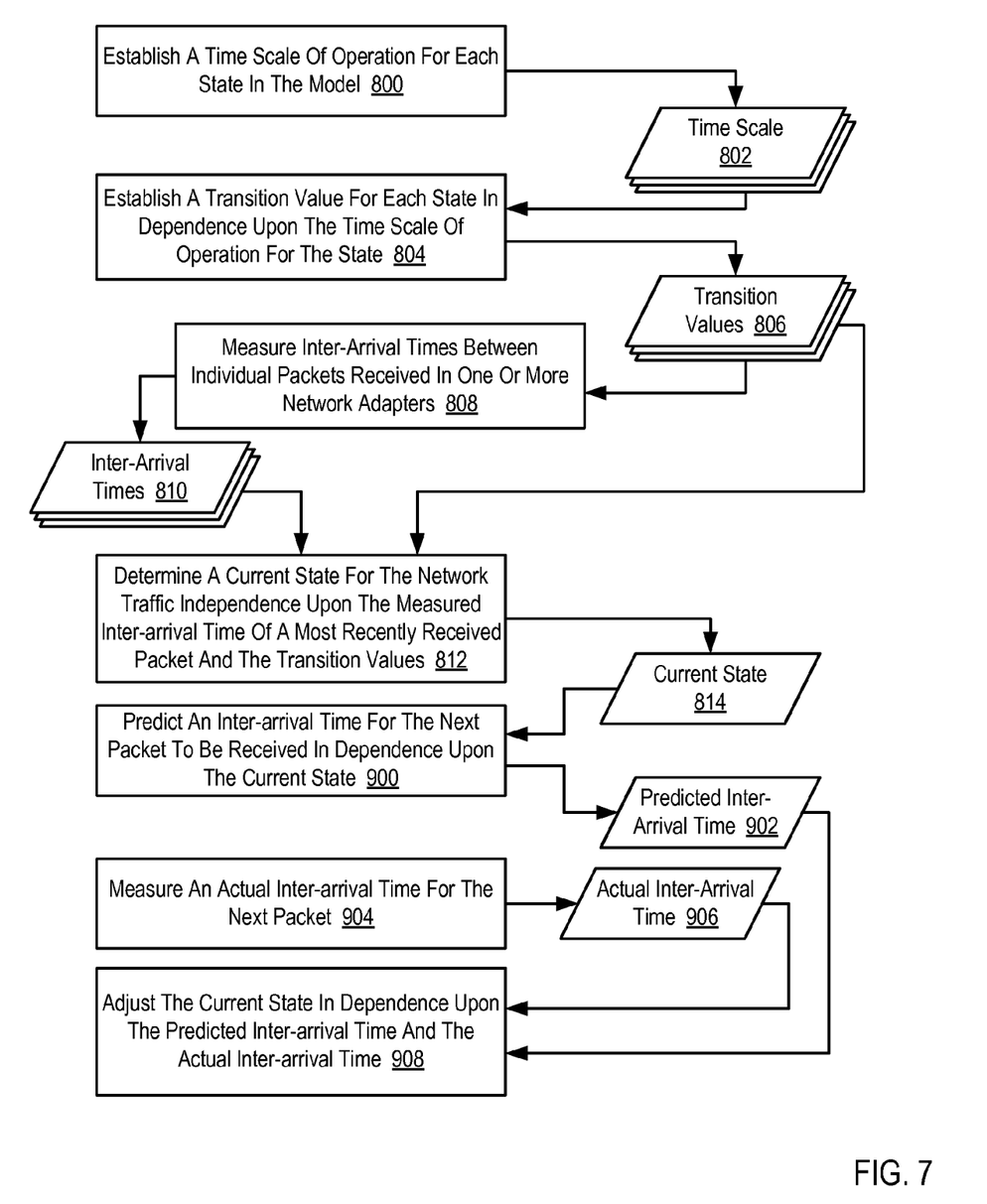
FIG. 7 sets forth a flow chart illustrating a further exemplary method for analyzing network traffic using an improved Markov Modulated Poisson Process Model with one bursty state and a plurality of idle states according to embodiments of the present invention.

The method of FIG. 7 is similar to the method of FIG. 6. That is, the method of FIG. 7 is similar to the method of FIG. 6 in that the method of FIG. 7 includes establishing (800) a time scale (802) of operation for each state in the model, establishing (804) a transition value (806) for each state in dependence upon the time scale (802) of operation for the state, measuring (808) inter-arrival times (810) between individual packets received in one or more network adapters, and determining (812) a current state (814) for the network traffic independence upon the measured inter-arrival time (810) of a most recently received packet and the transition values (806).

The method of FIG. 7 differs from the method of FIG. 6, however, in that the method of FIG. 7 includes predicting (900) an inter-arrival time (902) for a next packet to be received in dependence upon the current state (814). Predicting (900) an inter-arrival time (902) for a next packet to be received in dependence upon the current state (814) according to the method of FIG. 7 may be carried out by generating a random number according to the probability defined by the exponential distribution of the current state (814) using the distribution mean and distribution standard deviation. The generated random number represents the predicted inter-arrival time (902) for a next packet to be received. An application utilizing the method of FIG. 7 may use the predicted inter-arrival time (902) in an effort to synchronize user processes with the completion of a receive operation at the system to network interface. Readers will note, however, that such a use of the method of FIG. 7 is for explanation and not for limitation.

The method of FIG. 7 also includes measuring (904) an actual inter-arrival time (906) for the next packet. Measuring (904) an actual inter-arrival time (906) for the next packet according to the method of FIG. 7 may be carried out by in a manner similar to the measuring (808) inter-arrival times (810) between individual packets received in one or more network adapters as described above with reference to FIG. 6.

The method of FIG. 7 includes adjusting (908) the current state (814) in dependence upon the predicted inter-arrival time (902) and the actual inter-arrival time (906). Adjusting (908) the current state (814) in dependence upon the predicted inter-arrival time (902) and the actual inter-arrival time (906) according to the method of FIG. 7 may be carried out by lowering the value of the distribution mean for the current state (814) proportionally to the difference between the predicted inter-arrival time (902) and the actual inter-arrival time (906) if the predicted inter-arrival time (902) is higher than the actual inter-arrival time (906). Adjusting (908) the current state (814) in dependence upon the predicted inter-arrival time (902) and the actual inter-arrival time (906) according to the method of FIG. 7 may also be carried out by raising the value of the distribution mean for the current state (814) proportionally to the difference between the predicted inter-arrival time (902) and the actual inter-arrival time (906) if the predicted inter-arrival time (902) is lower than the actual inter-arrival time (906). The adjustments, higher or lower, to the value of the distribution mean for the current state (814) may be made according to the standard deviation of the exponential distribution for the current state (814) or according to any other increment as will occur to those of skill in the art. Adjusting (908) the current state (814) in dependence upon the predicted inter-arrival time (902) and the actual inter-arrival time (906) advantageously allow the analysis of network traffic using the improved MMPP Model according to embodiments of the present invention to become more accurate over time.

As mentioned above, the improved MMPP models according to embodiments of the present invention may be utilized to analyze or generate network traffic. For further explanation, therefore, FIG. 8 sets forth a flow chart illustrating an exemplary method for generating network traffic using an improved Markov Modulated Poisson Process ('MMPP') Model with one bursty state and a plurality of idle states according to embodiments of the present invention.

Figure 8:
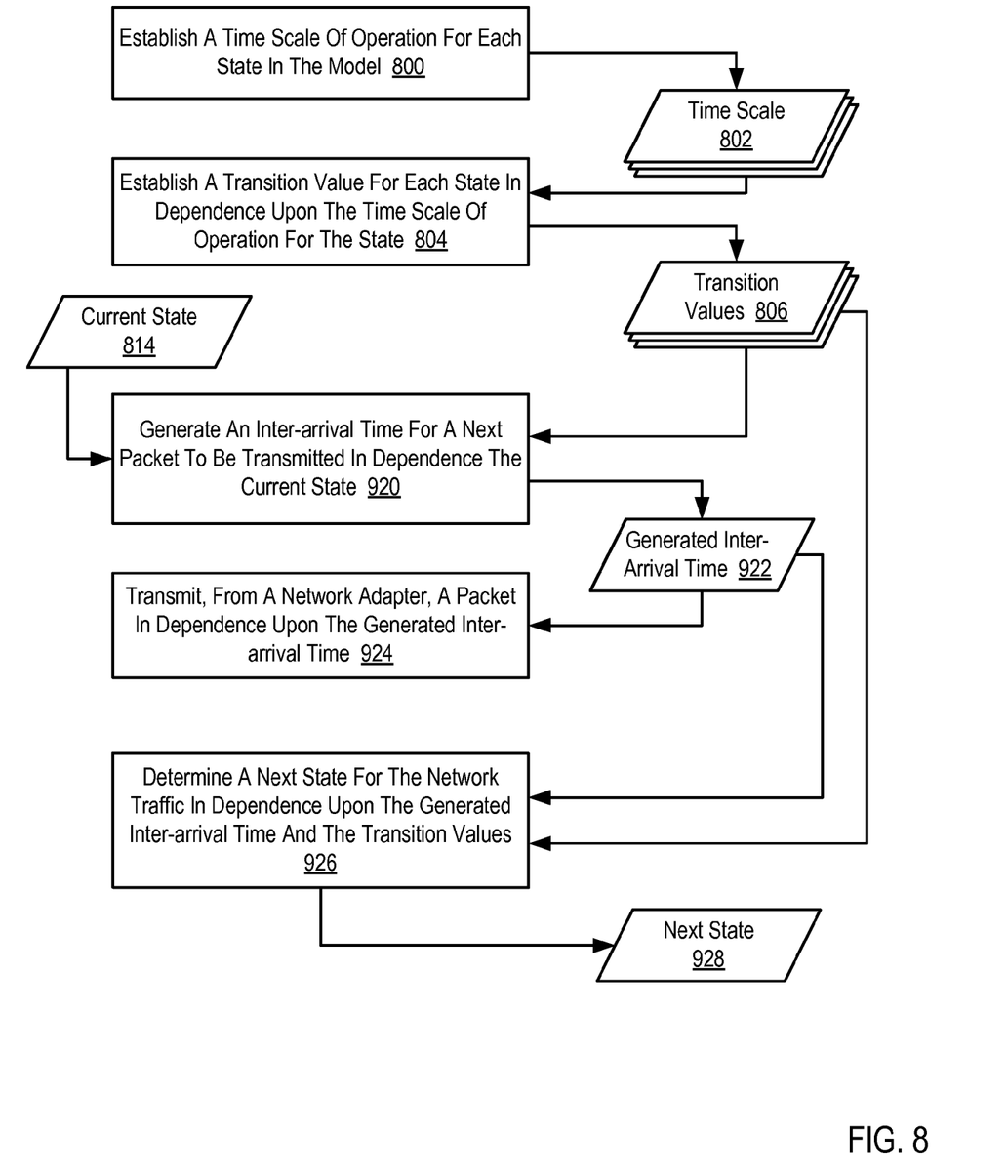
FIG. 8 sets forth a flow chart illustrating an exemplary method for generating network traffic using an improved Markov Modulated Poisson Process Model with one bursty state and a plurality of idle states according to embodiments of the present invention.

The method of FIG. 8 is similar to the method of FIG. 6. That is, the method of FIG. 8 is similar to the method of FIG. 6 in that the method of FIG. 8 includes establishing (800) a time scale (802) of operation for each state in the model and establishing (804) a transition value (806) for each state in dependence upon the time scale (802) of operation for the state. The example of FIG. 8 is also similar to the example of FIG. 6 in that the example of FIG. 8 includes current state (814).

The method of FIG. 8 differs from the method of FIG. 6 in that the method of FIG. 8 includes generating (920) an inter-arrival time (922) for a next packet to be transmitted in dependence upon a current state (814) for the improved MMPP model. Generating (920) an inter-arrival time (922) for a next packet to be transmitted in dependence upon a current state (814) for the improved MMPP model according to the method of FIG. 8 may be carried out by generating a random number according to the probability defined by the exponential distribution of the current state (814) using the distribution mean and distribution standard deviation. The generated random number represents the generated inter-arrival time (922) for a next packet to be transmitted.

The method of FIG. 8 also includes transmitting (924), from a network adapter, a packet in dependence upon the generated inter-arrival time (922). Transmitting (924), from a network adapter, a packet in dependence upon the generated inter-arrival time (922) according to the method of FIG. 8 may be carried out by transmitting the next packet across the network after the previous packet by a time period specified by the generated inter-arrival time (922). The network adapter may transmit the packet using any number of communication protocols such as, for example, IP, Ethernet™, the IEEE 802.11 family of specifications, and so on.

The method of FIG. 8 also includes determining (926) a next state (928) for the network traffic in dependence upon the generated inter-arrival time (922) and the transition values (806). Determining (926) a next state (928) for the network traffic in dependence upon the generated inter-arrival time (922) and the transition values (806) according to the method of FIG. 8 may be carried out by setting the next state (928) to the bursty state if the value of the generated inter-arrival time (922) is less than or equal to the transition value (806) for the bursty state when the current state (814) is an idle state. In such an embodiment, when the current state (814) is an idle state and the value of the generated inter-arrival time (922) is greater than the transition value (806) for the bursty state, then the next state (928) remains the idle state. Determining (926) a next state (928) for the network traffic in dependence upon the generated inter-arrival time (922) and the transition values (806) according to the method of FIG. 8 may be carried out by setting the next state (928) to the idle state having the highest transition value (806) less than or equal to the generated inter-arrival time (922) when the current state (814) is the bursty state. In such an embodiment, when the current state (814) is the bursty state and no idle state has a transition value (806) less than or equal to the generated inter-arrival time (922), then the next state (928) remains the bursty state.

In view of the explanations set forth above in this document, readers will recognize that practicing analysis and generation of network traffic using an improved Markov Modulated Poisson Process model with one bursty state and a plurality of idle states according to embodiments of the present invention provides the following benefits:

the ability to accurately synchronize a user process with the completion of the receive operation at the system to network interface, balance loads and route data in a network, tune system/network performance parameters, and provide real-time analysis of network traffic using a behavioral network traffic model instead of the complex mathematical models that exists in the current art, and the ability to generate bursty network traffic that is self-similar on multiple time scales for designing, testing, and evaluating products at the nodes of a network.

Exemplary embodiments of the present invention are described largely in the context of a fully functional computer system for workflow decision management. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for analyzing network traffic using an improved Markov Modulated Poisson Process ('MMPP') Model with one bursty state and a plurality of idle states, the method comprising:

establishing a time scale of operation for each state in the improved MMPP model, the improved MMPP model comprising a single MMPP model, the single MMPP model comprising only one bursty state and at least two idle states, wherein the time scale of operation for a particular state differs from the time scale of operation for all other states by at least one order of magnitude;

establishing a transition value for each state in dependence upon the time scale of operation for the state;

measuring inter-arrival times between individual packets received in one or more network adapters; and determining a current state for the network traffic in dependence upon the measured inter-arrival time of a most recently received packet and the transition values.

2. The method of claim 1 further comprising:

predicting an inter-arrival time for a next packet to be received in dependence upon the current state;

measuring an actual inter-arrival time for the next packet; and adjusting the current state in dependence upon the predicted inter-arrival time and the actual inter-arrival time.

3. The method of claim 1 further comprising adjusting the transition value for each state in dependence upon the measured inter-arrival times.

4. The method of claim 3 wherein adjusting the transition value for each state in dependence upon the measured inter-arrival times further comprises:

tracking changes in the inter-arrival times between individual data packets received during each state; and adjusting the transition value for each state in dependence upon the tracked changes for the state.

5. The method of claim 1 wherein the transition value for each state is a transition value $\lambda_{mean}$ that is a mean inter-arrival time of the packets received during the state.

6. The method of claim 1 wherein:

the transition value for the bursty state is a transition value $\lambda^B_{max}$ that represents an upper boundary for the inter-arrival times in a bursty state; and the transition value for each idle state is a transition value $\lambda^I_{min}$ that represents a lower boundary for the inter-arrival times in each idle state.

7. The method of claim 1 wherein analyzing network traffic using an improved MMPP Model with one bursty state and a plurality of idle states is carried out in real-time.

8. The method of claim 1 wherein the improved MMPP Model with one bursty state and a plurality of idle states further comprises two barrier states between the bursty state and each idle state in the improved MMPP Model.

9. A method for generating network traffic using an improved Markov Modulated Poisson Process ('MMPP') Model with one bursty state and a plurality of idle states, the method comprising:

establishing a time scale of operation for each state in the model, the improved MMPP model comprising a single MMPP model, the single MMPP model comprising only one bursty state and at least two idle states, wherein the time scale of operation for a particular state differs from the time scale of operation for all other states by at least one order of magnitude;

generating an inter-arrival time for a next packet to be transmitted in dependence upon a current state for the improved MMPP model; and transmitting, from a network adapter, a packet in dependence upon the generated inter-arrival time.

10. The method of claim 9 further comprising:

establishing a transition value for each state in dependence upon the time scale of operation for the state; and determining a next state for the network traffic in dependence upon the generated inter-arrival time and the transition values.

11. A computer program product for analyzing network traffic using an improved Markov Modulated Poisson Process ('MMPP') Model with one bursty state and a plurality of idle states, the computer program product disposed upon a computer-readable recording medium, the computer program product comprising computer program instructions capable of:

establishing a time scale of operation for each state in the improved MMPP model, the improved MMPP model comprising a single MMPP model, the single MMPP model comprising only one bursty state and at least two idle states, wherein the time scale of operation for a particular state differs from the time scale of operation for all other states by at least one order of magnitude;

establishing a transition value for each state in dependence upon the time scale of operation for the state;

measuring inter-arrival time between individual packets received in one or more network adapters; and determining a current state for the network traffic in dependence upon the measured inter-arrival time of a most recently received packet and the transition values.

12. The computer program product of claim 11 further comprising computer program instructions capable of:
predicting an inter-arrival time for a next packet to be received in dependence upon the current state;
measuring an actual inter-arrival time for the next packet; and
adjusting the current state in dependence upon the predicted inter-arrival time and the actual inter-arrival time.

13. The computer program product of claim 11 further comprising computer program instructions capable of adjusting the transition value for each state in dependence upon the measured inter-arrival times.

14. The computer program product of claim 13 wherein adjusting the transition value for each state in dependence upon the measured inter-arrival times further comprises:
tracking changes in the inter-arrival times between individual data packets received during each state; and
adjusting the transition value for each state in dependence upon the tracked changes for the state.

15. The computer program product of claim 11 wherein the transition value for each state is a transition value $\lambda_{mean}$ that is a mean inter-arrival time of the packets received during the state.

16. The computer program product of claim 11 wherein:
the transition value for the bursty state is a transition value $\lambda^B_{max}$ that represents an upper boundary for the inter-arrival times in a bursty state, and
the transition value for each idle state is a transition value $\lambda^I_{min}$ that represents a lower boundary for the inter-arrival times in each idle state.

* * * * *